(12) United States Patent
Michioka et al.

(10) Patent No.: US 6,315,451 B1
(45) Date of Patent: Nov. 13, 2001

(54) SLIDE GUIDE UNIT

(75) Inventors: Hidekazu Michioka; Kaoru Hoshide, both of Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/592,765

(22) Filed: Jun. 13, 2000

(30) Foreign Application Priority Data

Jun. 23, 1999 (JP) .................................................. 11-177421

(51) Int. Cl.⁷ ............................ F16C 29/02; F16H 25/20
(52) U.S. Cl. ............................................ 384/42; 74/89.32
(58) Field of Search .......................... 384/42, 43–45, 384/10, 13, 26; 74/424.71–424.96, 89.32

(56) References Cited

U.S. PATENT DOCUMENTS

| | | | |
|---|---|---|---|
| 4,848,174 | * 7/1989 | Brown et al. | 74/424.75 |
| 5,735,174 | * 4/1998 | Enomoto | 74/89.32 |
| 5,735,610 | * 4/1998 | Mark et al. | 384/42 |
| 6,053,062 | * 4/2000 | Ishikawa et al. | 74/89.32 |

FOREIGN PATENT DOCUMENTS

4118479-A * 1/1992 (DE) .

OTHER PUBLICATIONS

Abstract of Japanese Patent Publ. No. 09273550; dated Oct. 21, 1997.

* cited by examiner

*Primary Examiner*—Thomas R. Hannon
(74) *Attorney, Agent, or Firm*—Arent Fox Kintner Plotkin & Kahn, PLLC

(57) ABSTRACT

A slide guide unit wherein the nut member for applying a driving force to the slider and a sliding contact member for supporting the slider in motion with respect to the track rail are firmly fixed to the slider and which may be manufactured simply at low cost without increasing the number of components. The slide guide unit is characterized in that the slider is composed of a metallic core block having a mounting surface for a movable body and a resin portion built around the core block by molding, and in that the sliding contact member in sliding contact with the track rail and the nut portion in which the screw shaft is screwed are formed in a single resin piece.

5 Claims, 10 Drawing Sheets

SLIDE GUIDE UNIT

BACKGROUND OF THE INVENTION

1. Field of the Invention

The present invention relates to a slide guide unit used for a semi-conductor inspection apparatus, etc. which linearly guides a movable body such as a table mounted on a slider along a track rail and, more specifically, the invention relates to a slide guide unit a screw shaft for linearly driving the slider is screwed in the slider so as to pass therethrough.

2. Description of a Related Art

As a slide guide unit of this type, the unit disclosed in Japanese Patent Laid-Open No. 273550/1997 is known. The slide guide unit includes a track rail formed in the shape of a channel with a concave groove and having a slide guide surface formed along the length thereof, a screw shaft disposed in the concave groove along the length of the track rail, and a slider including a sliding contact member to be in contact with the slide guide surface of the track rail and a nut member to be screwed onto the screw shaft, wherein in case where the screw shaft is rotated for example by a motor, the slider moves within the concave groove of the track rail according to the amount of revolution so that the turns of the screw for the movable body, such as a table, mounted on the slider to be guided in any given motion in either direction are precisely determined.

The slider is movably supported by sliding contact between its sliding contact member and the sliding guide surface of the track rail. The sliding contact member is made of an abrasion resistant material such as a resin containing carbon fiber, ceramic, or sintered alloy. The Japanese Patent Laid-Open No. 273550/1997 suggests that the sliding contact member be bonded to the slider at a position facing the slide guide surface on the track rail, and in case where a resin material such as a carbon fiber dispersed in resin or a metallic powder dispersed in resin is used to form the sliding contact member, it may be modeled on the slider by injection molding.

On the other hand, the nut portion for converting the rotational movement of the screw shaft into the linear movement of the slider is provided with an internal thread to be in sliding contact with the external thread formed on the screw shaft, and is made of an abrasion and load resistant material. The nut member is bonded to the through hole provided on the slider.

In the slide guide unit having such a structure, since a driving force along the track rail is applied from the nut portion screwed onto the screw shaft to the slider, and the slide is supported in free reciprocating motion by sliding contact with the sliding contact pad of the track rail, the nut member and the sliding contact member have to be firmly fixed to the slider so as not to become detached from the slider.

However, in the slide guide unit described in Japanese Patent Laid-Open No. 273550/1997, since the nut member and the sliding contact member are fixed to the slider only by an adhesive, there is apprehension that the nut member or the sliding contact member may become detached from the slider accidentally due to a large force applied in the direction of travel of the slide to the nut member or the sliding contact member in the event that the direction of travel of the slider is suddenly reversed.

In order to fix the nut member and the sliding contact member to the slider so that they resist such a force, a pair of lid bodies can be fixed for example by bolts to the front and rear end surfaces of the slider so that the lid bodies hold the nut member and the sliding contact member on the slider. However, providing such lid bodies on the slider results in the expenditure of time and effort to assemble the slider, increase in the number of components, and thus increase in cost. In addition, when the lid bodies are fixed on the front and rear end surfaces of the slide as described above, the length of the slider increases by the length corresponding to that of the lid bodies, thereby the size of the unit itself increases with respect to the amount of stroke of the slider in its reciprocating motion.

SUMMARY OF THE INVENTION

The invention is directed to solve the problems described above, and it is an object of the invention is to provide a slide guide unit wherein the nut member for applying a driving force to the slider and the sliding contact member for supporting the slider in motion with respect to the track rail are firmly fixed to the slider and which may be manufactured in a simple manner at low cost without increasing the number of components.

In order to achieve the object described above, the slide guide unit of the invention comprises: a track rail formed with a slide guide surface along the length thereof; a screw shaft disposed in parallel with the track rail and formed with a helical slide thread groove on the outer periphery thereof; and a slider including a sliding contact member to be brought into contact with the slide guide surface of the track rail and a nut portion to be screwed onto the screw shaft for guiding the movable body along the track rail according to the revolution of the screw shaft, characterized in that the slider includes a metallic. core block having a surface for mounting the movable body thereon and a resin portion built around the core block by molding, and in that the sliding contact portion and the nut portion are formed in this single resin portion.

According to the technological means as described above, since the slider is formed by molding a resin portion around the metallic core block, and the sliding contact member being in contact with the track rail and the nut member screwed on the screw shaft are formed in this single resin portion, the nut portion and the sliding contact member are firmly integrated with respect to each other, which prevents the nut portion and the sliding contact portion from becoming detached from the slider even when the direction of movement of the slide is suddenly reversed. In addition, since the sliding contact member and the nut member may be provided concurrently by the injection molding on the core block inserted within the metallic mold, the number of processes and the number of components required for manufacturing the slider may be reduced and thus it may be manufactured at low cost.

From the viewpoint of integrating the resin portion and the sliding contact portion more firmly with respect to each other, it is preferable to build the resin portion on the core block so as to wrap around the front, rear, right and left sides of the slider. In such a structure, the core block cannot be separated from the resin portion in the direction of travel of the slider, and therefore the sliding contact member and the nut portion formed with the resin portion may be integrated into the slider in a single piece.

From the viewpoint of eliminating rattling of the slider with respect to the track rail and the error of movement during reciprocating motion, it is preferable to construct the slider in such a manner that the sliding contact member and/or the nut portion of the slider come into contact with the slide guide surface of the track rail and the slide thread groove of the screw shaft elastically. For example, by forming a slit in the sliding contact member and/or the nut portion along the length of the slider, elasticity may be given to the sliding contact member and/or the nut portion.

As described so far, according to the invention, since the sliding contact portion to be in contact with the track rail and the nut portion to be screwed onto the screw shaft are built around the metallic core block by molding a resin, and the sliding contact member and the nut portion are formed in a single piece, the nut portion and the sliding contact member are firmly integrated to the slider, and thus the nut member for applying a driving force to the slider and the sliding contact member for supporting the slider in motion with respect the track rail may be firmly fixed on the slider.

In addition, since the sliding contact member and the nut portion are provided concurrently on the slider by injection molding with the core block inserted in the metallic mold, the number of processes and the number of components required to manufacture the slide is lowered, and thus it may be manufactured in a simple manner and at low cost.

DESCRIPTION OF THE PREFERRED EMBODIMENTS

Referring now to the accompanied drawings, the slide guide unit according to the invention will be described in detail.

Figure 1:
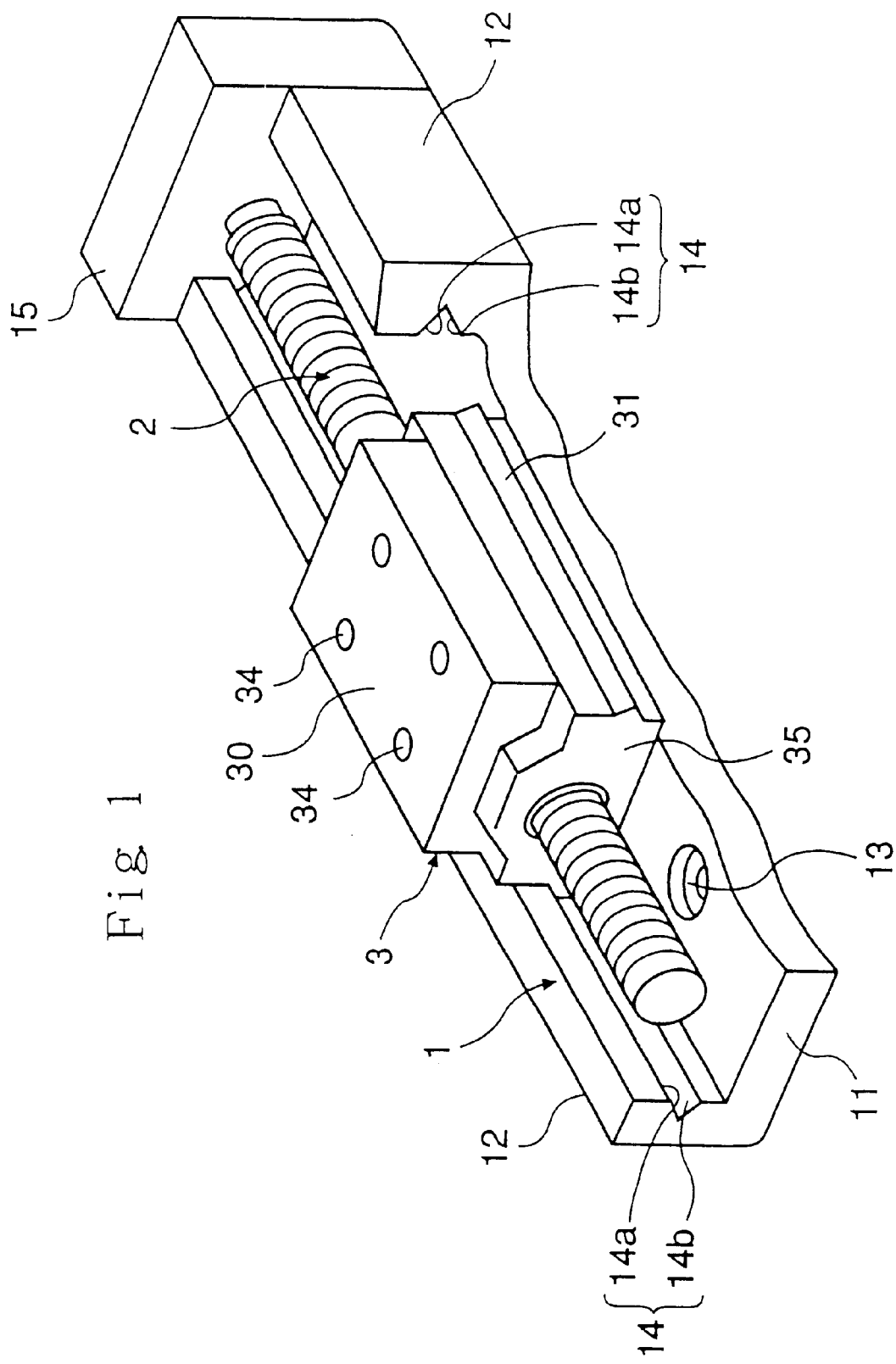
FIG. 1 is a perspective view illustrating a slide guide unit according to the first embodiment of the invention.
Figure 2:
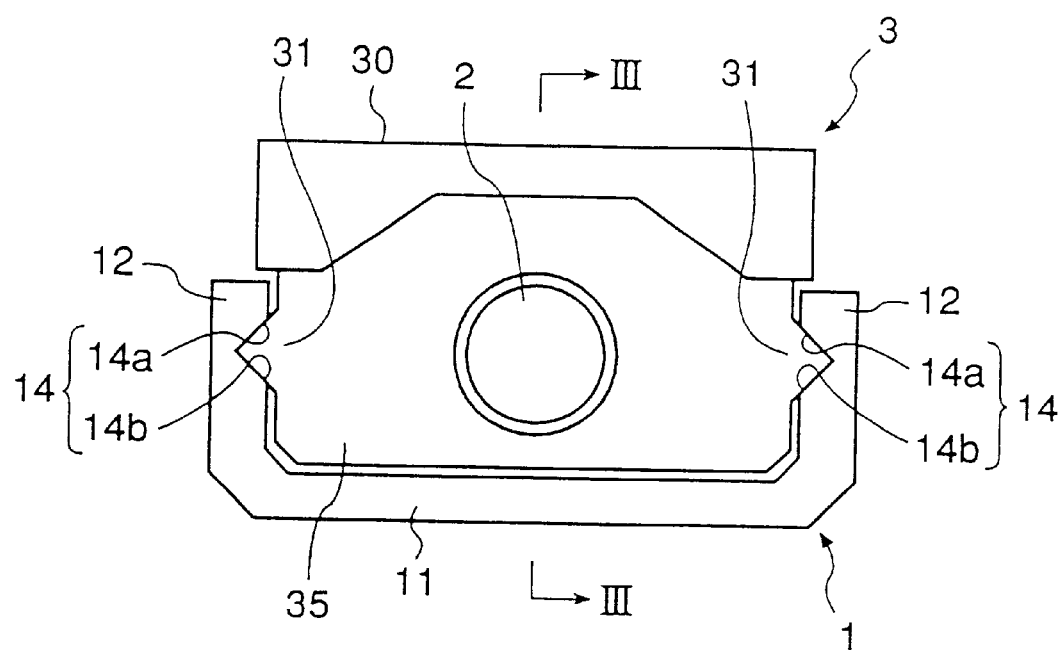
FIG. 2 is a front view illustrating the slide guide unit according to the first embodiment.

FIG. 1 and FIG. 2 illustrate slide guide unit according to the first embodiment to which the invention is applied. In the same figure, an reference numeral 1 denotes a track rail formed in a state of channel with a concave groove, 2 denotes a screw shaft disposed in the concave groove in parallel with the track rail 1, and 3 denotes a slider to be screwed on the screw shaft 2 and moves in the concave groove of the track rail 1 in reciprocal motion.

The track rail 1 is defined by a bottom portion 11 and a pair of side walls 11 and 12 standing vertically from both edges of the bottom portion 11 to form a U-shape in cross-section, and a bolt insertion bores 13 formed longitudinally at prescribed intervals on the bottom portion 11 for fixing the track rail 1 onto a fixed portion such as a bed. The inner surface of each side wall 12 is provided with a guide groove 14 notched in approximately V-shape along the length thereof, and each guide groove is formed by a pair of slide guide surfaces 14a and 14b inclined 45° with respect to the horizontal line intersecting both surfaces.

The screw shaft 2 is disposed within the concave groove formed by a pair of side walls 12 on the track rail 1, and rotatably supported by the support plate fixed at one end of the track rail 1 and by the slider 3. On the outer periphery of the screw shaft 2, there is provided a helical slide thread groove 21 so that when the screw shaft 2 is rotated by the motor, not shown, fixed to the track rail 1 via the support plate 15, the slider 3 screwed thereon moves in the concave groove on the track rail according to the amount of revolution of the screw shaft 2.

On the other hand, the slider 3 is formed to be approximately rectangular and fitted with into the concave groove on the track rail 1 with a slight amount of clearance. The upper portion of the slider 3 is provided with a mounting surface 30 for fixing the movable body (not shown) such as a table, and the mounting surface 30 is provided with tap holes 34 for fixing the movable body by bolts. On both side surfaces of the slider 3 on the left and right with respect to the direction of travel thereof, there are provided sliding contact members 31 in approximately V-shape to be tightly fitted to the guide grooves 14 formed on the track rail 1 respectively, and the upward-inclining surface and the downward-inclining surface of the sliding contact member 31 are kept in contact with the slide guide surfaces 14a, 14b of the guide groove 14. As a consequence, the guide groove 14 and the sliding contact member 31 constitute a slide guide mechanism, wherein the slider 3 can move freely within the concave groove on the track rail 1 in reciprocating motion under the load of any direction applied to the slider 3 from a direction parallel to the plane of FIG. 2.

Figure 3:
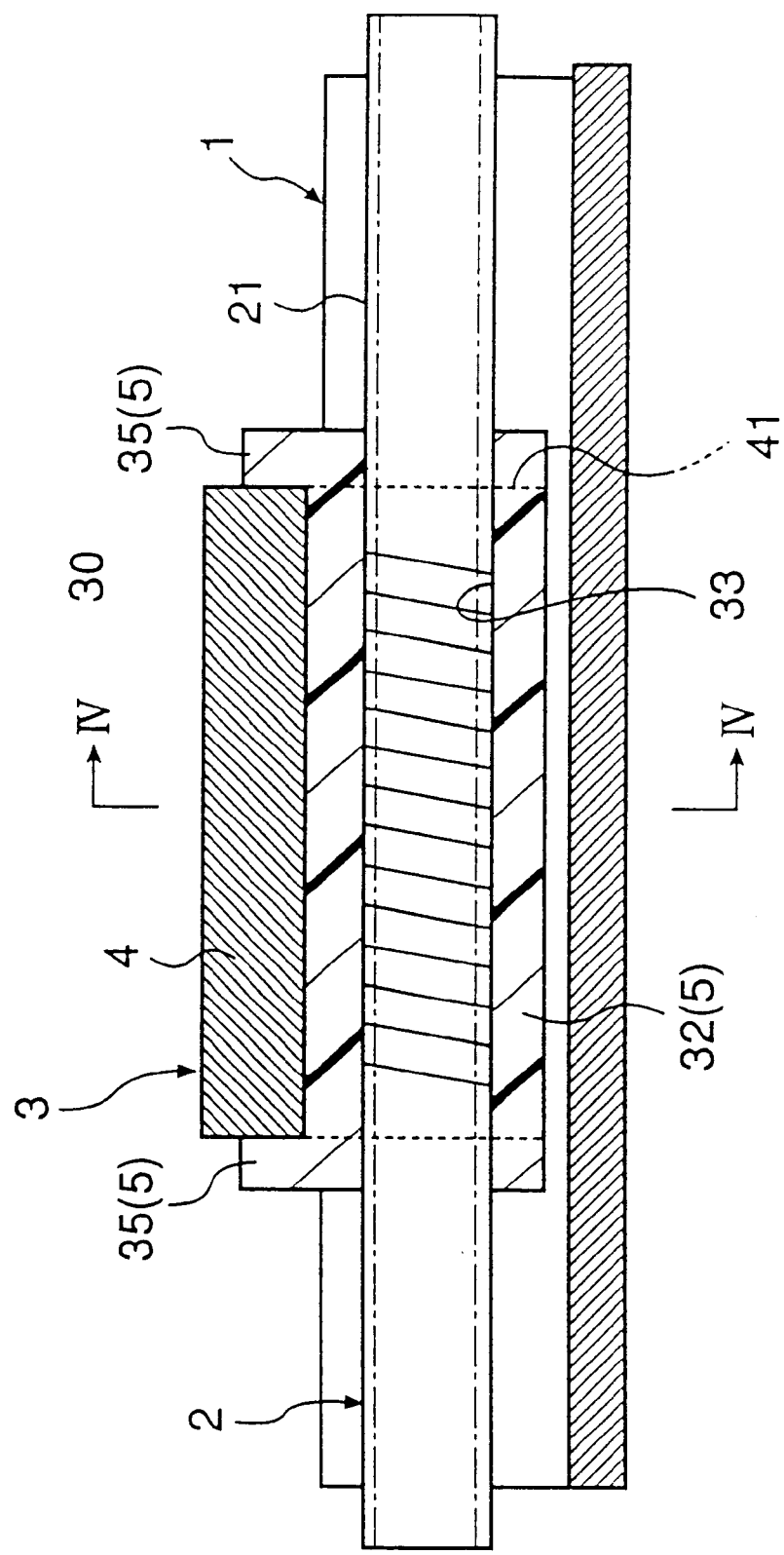
FIG. 3 is a cross-sectional view of the slide guide unit taken along the line III—III in FIG. 2.

The slider 3 is provided with a nut portion 32 to be screwed on the screw shaft 2. As shown in FIG. 3, the nut portion 32 is provided with a through hole 33 for receiving the screw shaft 2 therethrough, and the inner peripheral surface of the through hole 33 is provided with an internal thread to be engaged with the slide thread groove 11 formed on the screw shaft 2 as an external thread.

Figure 4:
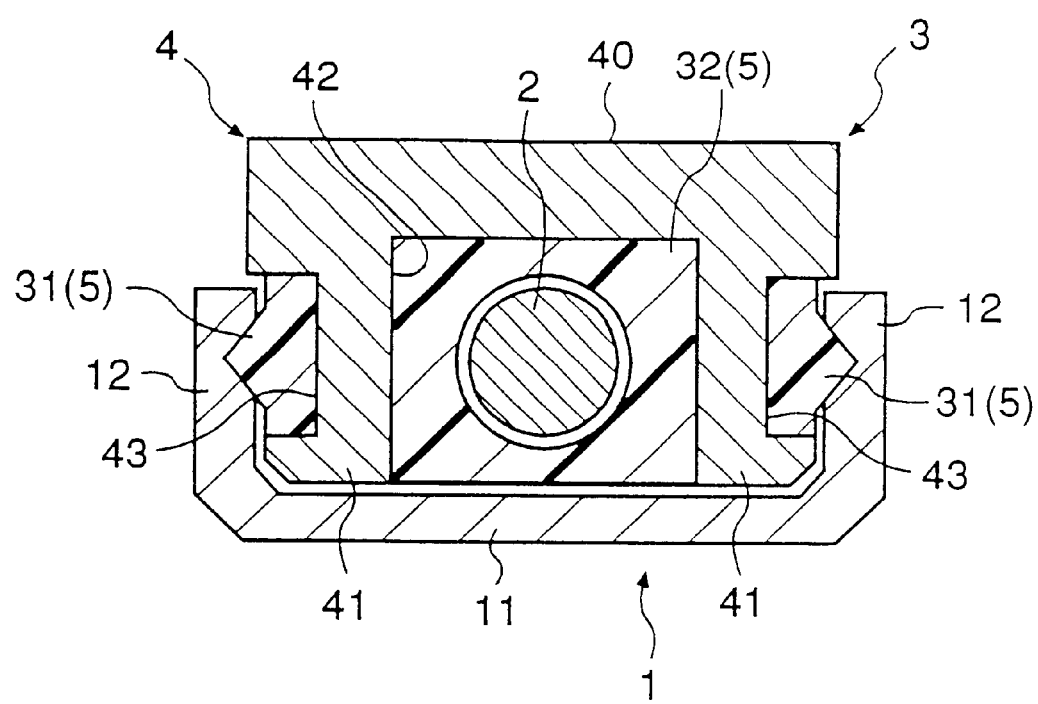
FIG. 4 is a cross-sectional view of the slide guide unit taken along the line IV—IV of FIG. 3.

As shown in FIG. 3 and FIG. 4, the slider 3 comprises a metallic core block 4 provided with a mounting surface 30 for a movable body and a resin portion 5 built around the core block 4 by injection molding. Since the mounting surface 30 is required to be rigid to a high degree of precision in order to fix the movable body accurately, and the tap bores 34 are required to be mechanically strong, they are formed on the metallic core block 4. On the other hand, since the sliding contact portion 31 and the nut portion 32 are kept in sliding contact with the slide guide surfaces 14a, 14b of the track rail 1 and the slide thread groove formed on the screw shaft 2, they are required to be abrasion resistant and to have a low friction coefficient, and thus they are formed of the resin portion 5. As a material for the resin portion 5, a resin containing carbon fibers or metallic powder dispersed at a prescribed ratio may be used in order to improve the mechanical strength. It is also possible to use for example an oleoresin to provide lubrication of the slide guide surfaces 14a, 14b and the slide thread groove.

As shown in FIG. 4, the core block 4 is provided with a horizontal portion 40 defining the mounting surface 30, and a pair of skirt portions 41, 41 drooping from both ends of the horizontal portion 40, and the resin portion 5 constituting the nut portion 32 is molded within the recess 42 surrounded by the horizontal portion 40 and the skirt portions 41, 41. There is also a recess 43 formed on the outer side of each skirt portion 41 along the direction of travel of the slider 3, and in the recess 43, the resin portion 5 constituting the sliding contact member 31 is molded. In this embodiment, the sliding contact member and the nut portion are molded in such a manner that the shaft center of the screw shaft 2 and the center of the sliding contact member 31 approximately in V-shape are located horizontally to each other, in the same level.

While the nut portion 32 and the sliding contact part 31 are respectively fitted in the recesses 42, 43 of the core block, there is apprehension that they may become detached from the core block 4 due to for example a sudden reversal of the direction of travel of the slider 3 in case where members for holding them are not provided at the front and rear ends of the slider 3. Therefore, as shown in FIG. 2, the slider 3 of this embodiment is constructed in such a manner that the plate-shaped connecting portions 35 are molded with resin on both front and rear end surfaces of the core block 4, so that the sliding contact member 31 and the nut portion 32 constitute an unitary resin portion 5 via a connecting portion 35.

Accordingly, in the slider 3 of this embodiment, the nut portion 32 and the sliding contact member 31 formed by molding a resin are integrated so as to surround the skirt portion 41 of the core block, and the resin portion 5 is built on the core block so as to wrap around the front, rear, left, and right sides of the slider. As a consequent, the core block 4 and the sliding contact member 31 and the nut portion 43 formed by molding a resin are firmly integrated, and thereby separation of nut portion 32 and the sliding contact portion 31 from the slider 3 is reliably prevented even when a heavy load is applied to the slider 3 in the event for example the direction of travel of the screw shaft 2 is suddenly reversed.

In addition, the sliding contact member 31 and the nut portion 32 may be molded all at one time by carrying out the injection molding of the resin portion 5 with the core block 4 inserted within the metal mold, and the separation of the resin portion 5 and the core block 4 may be prevented by molding the sliding contact member 31 and the nut portion 32 into a single piece. Therefore the number of the processes and the components may be reduced in comparison with the case where the sliding contact member 31 and the nut portion 32 are bonded to the slider 3 individually, and thereby the slide guide unit may be manufactured at significantly lower cost.

In addition, in the slide guide unit of this embodiment, it is also possible to manufacture the support plate 15 to be fixed at one end of the track rail 1 by injection molding of a resin. In other words, the support plate 15 may be molded and fixed at one end of the track rail 1 by inserting and fixing one end of the track rail 1 into the metallic mold and then injecting a resin into the metallic mold. In this structure, it is not necessary to fix the support plate 15 to the track rail 1 afterward, and thus the expense in time and effort to align the shaft center of the screw shaft 2 rotatably supported by the support plate 15 with respect to the track rail is alleviated.

Figure 5:
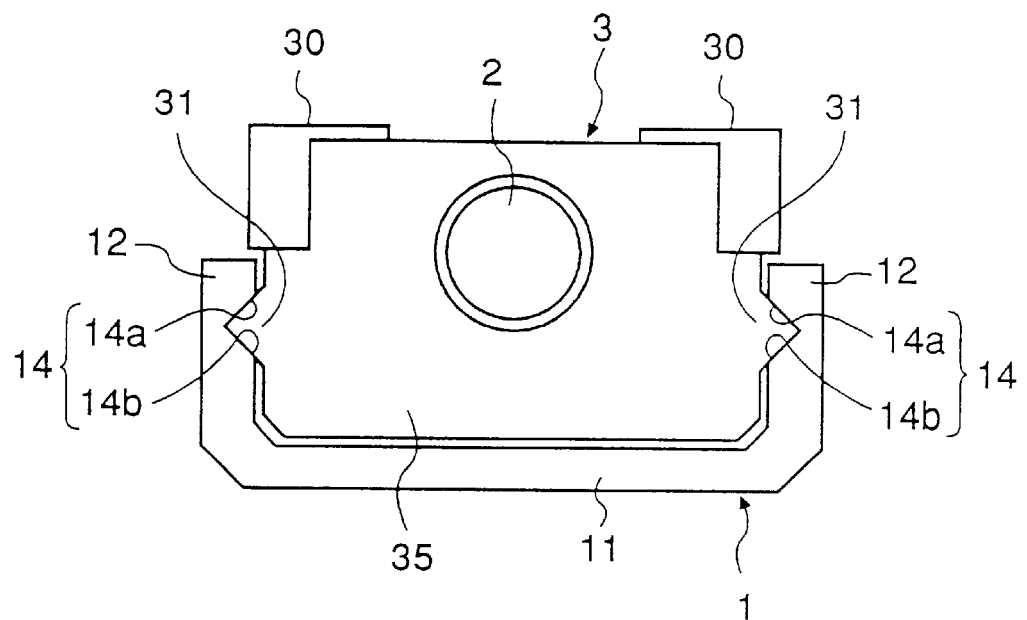
FIG. 5 is a front view illustrating the slide guide unit according to the second embodiment of the invention.
Figure 6:
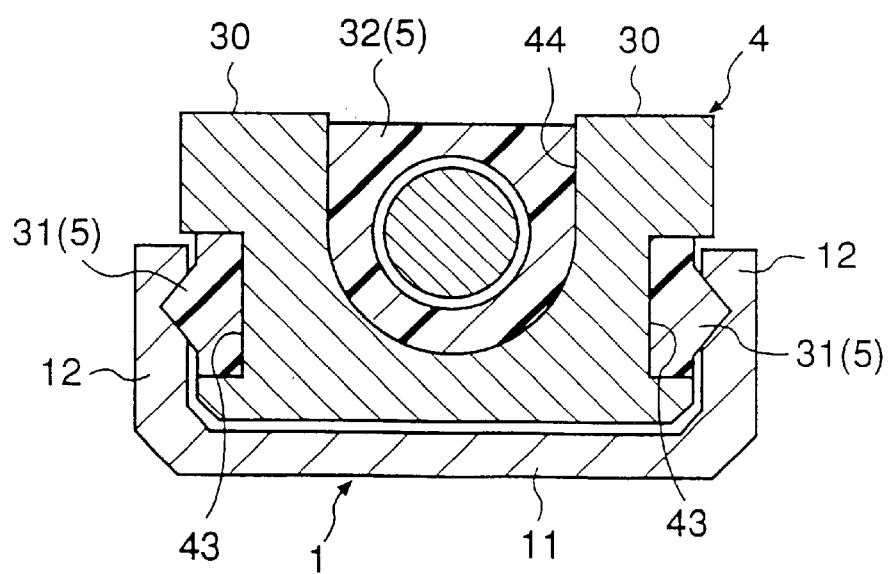
FIG. 6 is a front cross-sectional view of the slide guide unit according to the second embodiment.

FIG. 5 and FIG. 6 illustrate the second embodiment of the slide guide unit according to the invention.

While the recess 42 of the core block 4 where the nut portion is molded is located on the lower side of the core block 4 in the first embodiment, the recess 44 in the second embodiment is formed in the center on the upper side of the core block, and the nut portion 32 is built within the recess 44 by injection molding. Therefore, in the second embodiment, the horizontal level of the shaft center of the screw shaft 2 and of the center of the sliding contact member 31 are not coincident with each other, which differs from the first embodiment. Other respects such as that the front and rear end surfaces of the core block 4 are covered with the connecting portion made of a resin, and the sliding contact portion 31 and the nut portion 32 are formed into an unitary resin portion 5 are the same as the first embodiment. Therefore, reference numerals of the first embodiment are also used in FIG. 5 and FIG. 6, and detailed description is omitted.

Figure 7:
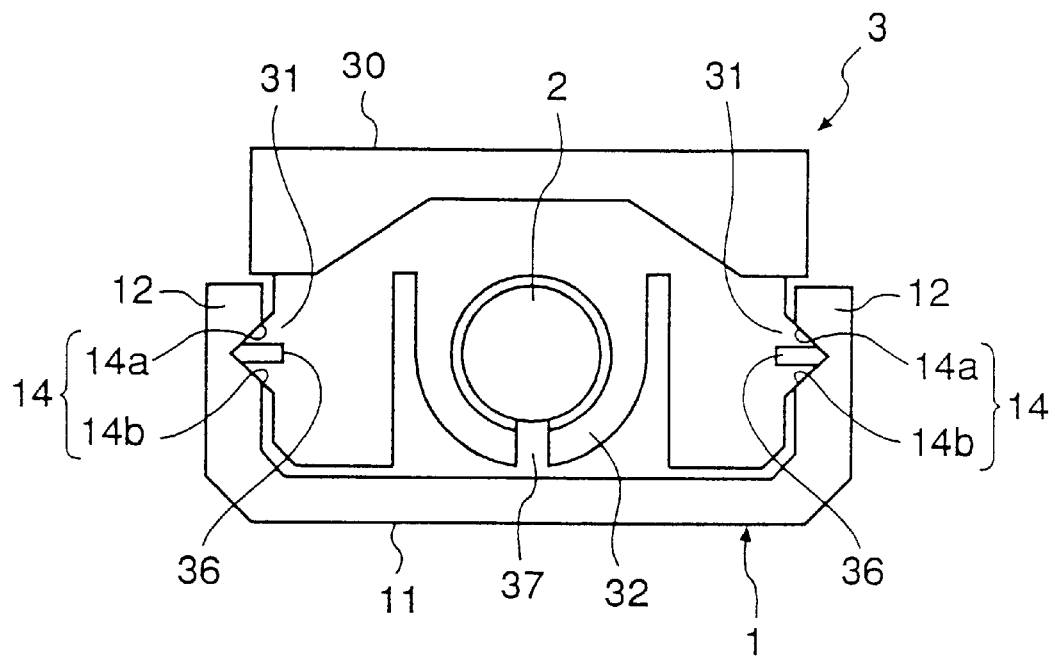
FIG. 7 is a front view illustrating the slide guide unit according to the third embodiment of the invention.
Figure 8:
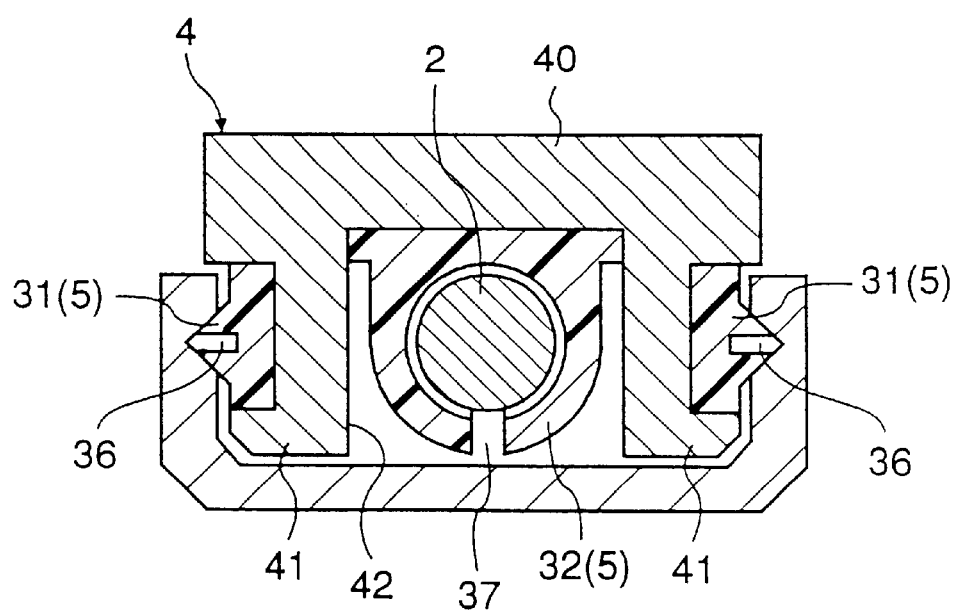
FIG. 8 is a front cross-sectional view of the slide guide unit according to the third embodiment.

FIG. 7 and FIG. 8 illustrate the third embodiment of the slide guide unit according to the invention.

In case where there are clearances between the slide guide surfaces 14a, 14b and the sliding contact member 31 of the slider 3, and between the slide thread groove 21 of the screw shaft 2 and the nut portion 32 to be screwed thereon, reciprocating motion of the slider 3 given by rotating the screw shaft 2 may cause rattling of the slider 3 or repeated misalignments, and thus the movable body such as a table fixed to the slider 3 cannot be guided accurately.

Therefore, in the third embodiment, a slit 36 is formed in the center of the approximately V-shaped sliding contact member 31 along its length so that the sliding contact member 31 elastically opens toward each slide guide surfaces 14a, 14b in order to eliminate the clearance between the sliding contact member 31 and the slide guide surfaces 14a, 14b. More specifically, the sliding contact member 31 on the side of the slider 3 is molded slightly larger than the V-shaped guide groove 14 on the side of the track rail 1, and the slider 3 is assembled in the track rail 1 with the sliding contact member 31 squeezed so as to lessen the width of the slit 36. As a consequence, the sliding contact member 31 is brought into contact with respective slide guide surfaces 14a, 14b elastically, and thereby the clearance between them may be eliminated to prevent rattling of the slider 3.

On the other hand, in order to eliminate a clearance between the slide thread groove 21 formed on the screw shaft 2 and the nut portion 32, a slit 37 is provided on the nut portion 32 along the length of the slider 3, so that the nut 32 squeezes the screw shaft 2 elastically. In order to enhance the flexibility of the nut portion 32, the nut portion 32 is not molded so as to fill the recess 42 of the core block 4 as in the first embodiment, but is formed so as to surround the screw shaft 2 in the shape of an annulus ring. More specifically, the nut 32 is molded in such a manner that the inner diameter of the nut portion 32 is slightly smaller than the outer diameter of the screw shaft 2, so that the screw shaft 2 being screwed in the nut portion 32 causes the slit 37 to be opened. Therefore, the nut portion 32 comes in contact with the slide thread groove formed on the screw shaft 2 elastically, so that the clearance between them is eliminated and the accuracy of the repeated alignments during reciprocating motion of the slider 3 may be improved. Since the structure other than the point described above is the same as the first embodiment, the same reference numerals are used in the figures and the detail description is omitted.

Figure 9:
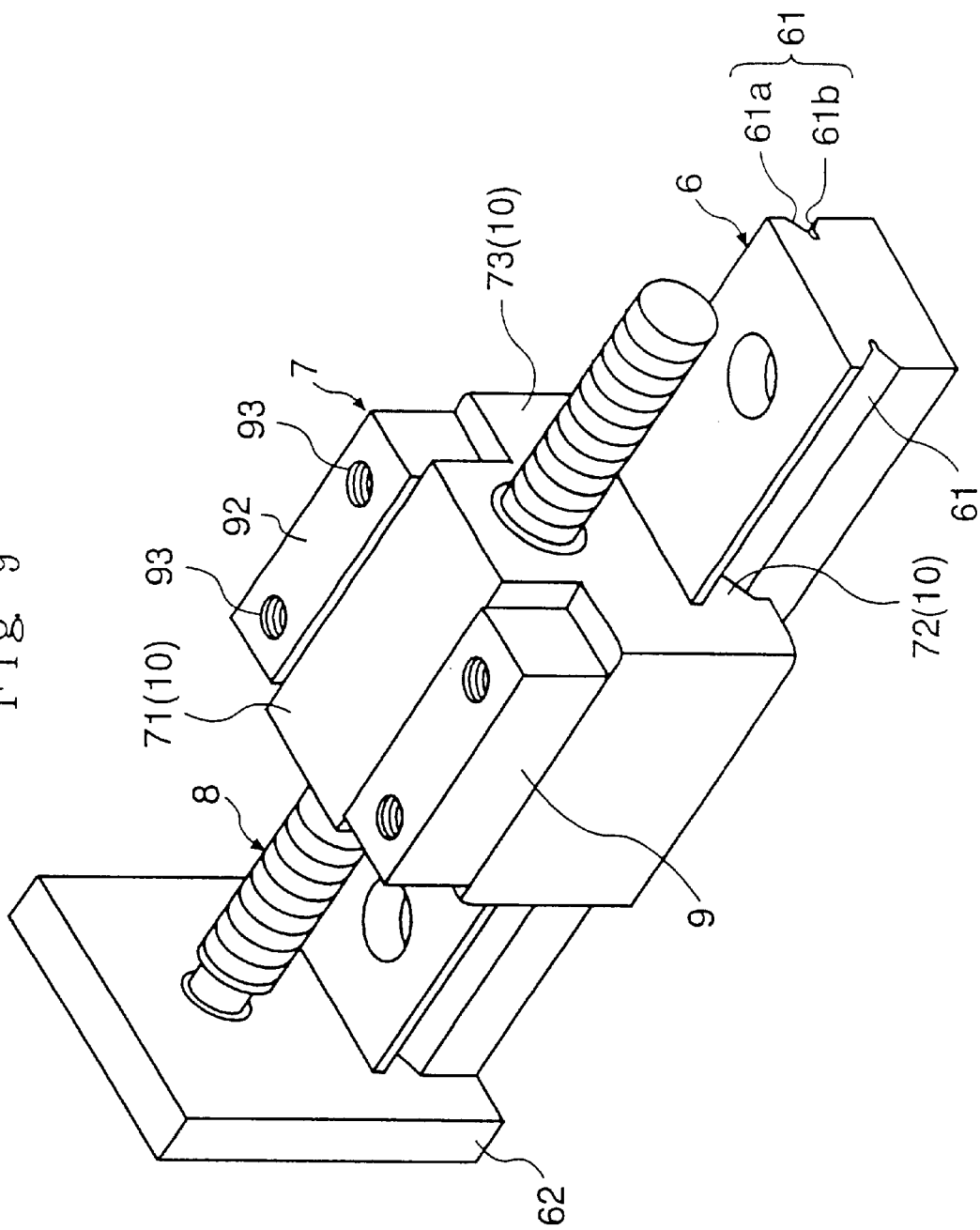
FIG. 9 is a perspective view illustrating the slide guide unit according to the fourth embodiment of the invention.
Figure 10:
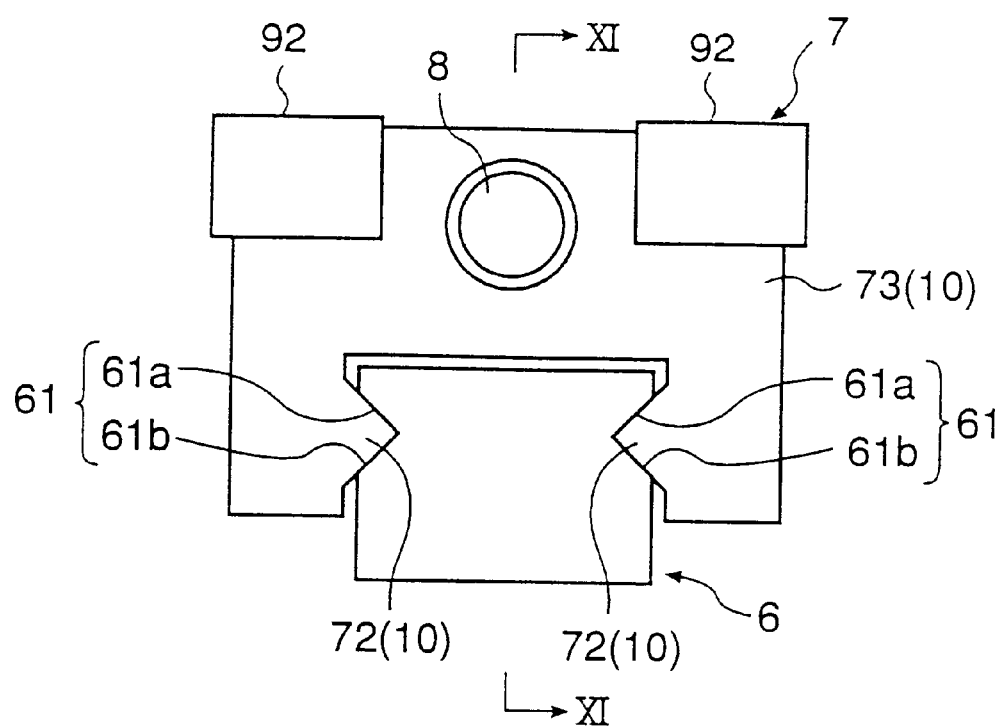
FIG. 10 is a front view illustrating the slide guide unit according to the fourth embodiment.

FIG. 9 and FIG. 10 illustrate the fourth embodiment of the slide guide unit according to the invention.

In the case of the slide guide unit of the first embodiment shown in FIG. 1, the track rail 1 is formed in the shape of a channel and the slider 3 is constructed so as to move back and forth in the concave groove of the track rail 1 with the rotation of the screw shaft 2, but the track rail 6 of the fourth embodiment is formed to be approximately rectangular in cross section, and the slider 7 is disposed across the track rail 6. Also, the screw shaft 8 is rotatably supported by the support plate 62 fixed on the track rail, and is screwed in the slider 7.

On both sides of the track rail 6 that is rectangular in cross section, approximately V-shaped guide grooves 61 are respectively notched thereon, so that the downward-inclined surface and the upward-inclined surface defining the guide groove 61 serve as slide guide surfaces 61a, 61b for guiding the slider 7.

Figure 11:
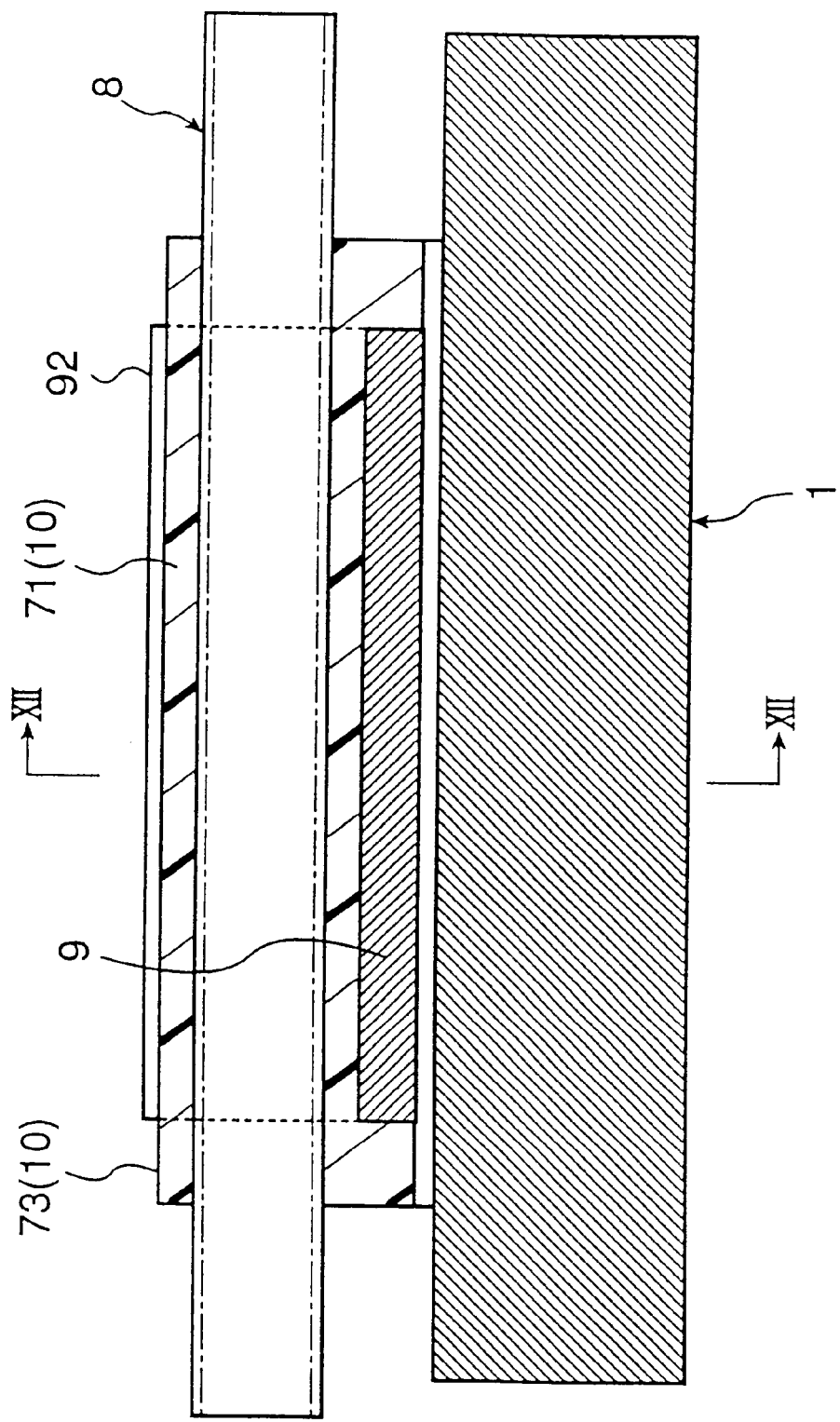
FIG. 11 is a cross-sectional view of the slide guide unit taken along the line XI—XI of FIG. 10.
Figure 12:
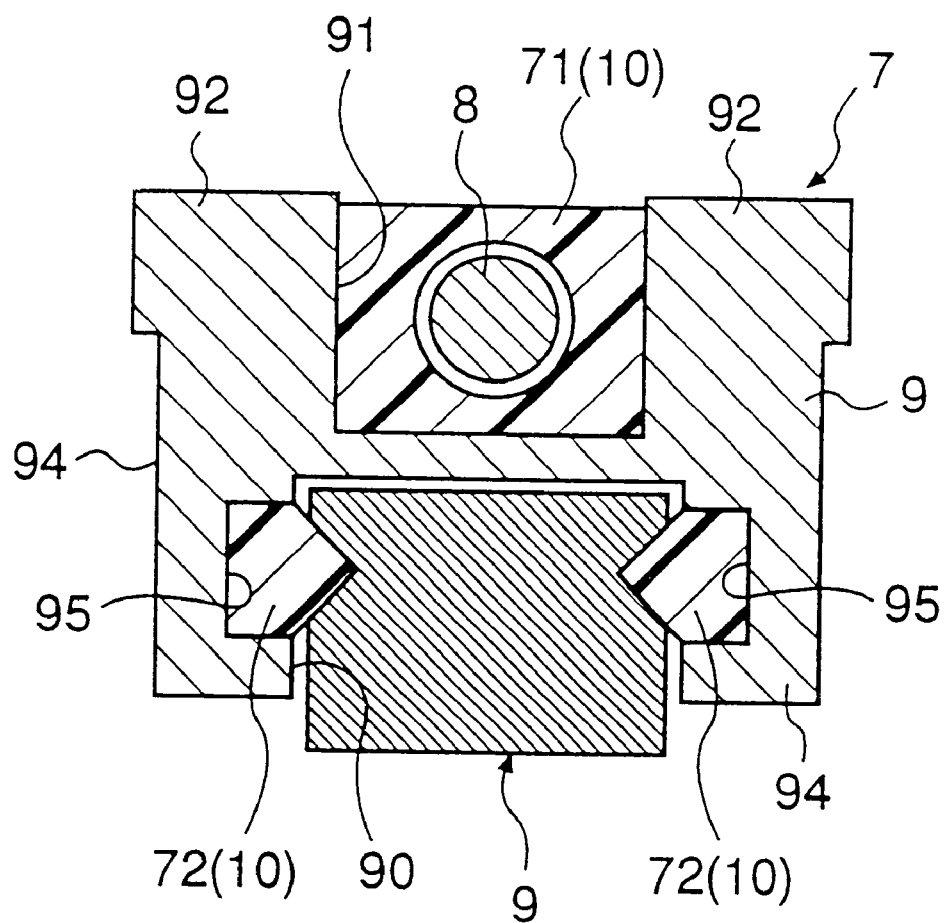
FIG. 12 is a cross sectional view of the slide guide unit taken along the line XII—XII of FIG. 11.

On the other hand, as shown in FIG. 11 and FIG. 12, the slider 7 is formed by building a resin portion 10 onto the metallic core block 9 by injection molding. The resin used for the injection molding may be the same as the one shown in the first embodiment. The core block 9 is H-shape in cross-section having concave grooves on the upper portion and the lower portion thereof along the length of the slider. In the lower concave groove 90, the track rail 6 is loosely fitted via a slight amount of clearance, and in the upper concave groove 91, the nut portion 71 to be screwed into by the screw shaft 8 is molded with a resin. The upper surface of the core block 9 on right and left sides of the upper concave groove serves as a mounting surface 92 for the movable body such as a table, and a tap bores 93 are formed on the mounting surface 92 for fixing the movable body.

On the inner surfaces of a pair of skirt portions 94, 94 forming the lower concave groove 90 on the core block 9, a recess 95 is formed along the length of the slider 7, and in the recess 95, a sliding contact member 72 projecting in V-shape is molded with a resin. The sliding contact member 72 is tightly fitted to the guide groove 61 on the track rail 6, and forms a slide guide mechanism for supporting the slider 7 in its reciprocating motion between the pair of slide guide surfaces 61a, 61b.

Also in the slide guide unit of the fourth embodiment, in order to fix the resin molded nut portion and the sliding contact member 72 firmly to the core block 9, plate-shaped connecting portions 73 are molded on the front and rear end surfaces of the slide 7 with a resin so as to cover the core block 9, which forms the nut portion 71 and the sliding contact member 72 in a single piece. In other words, since the nut portion 71 and the sliding contact member 72 are integrated as a part of the resin portion 10 so as to surround the core block 9, the core block 9 and the sliding contact member 72 and the nut portion 71 molded with a resin are firmly integrated, which ensures that the nut portion 71 and the sliding contact member 72 are prevented from being separated from the slider 7 even when a sudden change in direction of the screw 8 puts a great load on the slider 7.

What is claimed is:

1. A slide guide unit comprising:

a track rail formed with a slide guide surface along the length thereof;

a screw shaft disposed in parallel with said track rail and formed with a helical slide thread groove on the outer periphery thereof; and a slider including a sliding contact member to be brought into contact with the slide guide surface of said track rail and a nut portion to be screwed onto said screw shaft for guiding a movable body along said track rail with the revolution of said screw shaft;

characterized in that said slider includes a metallic core block having a mounting surface for mounting a movable body thereon and a resin portion built around said core block by molding, and in that said sliding contact member and the nut portion are formed in this single resin portion.

2. The slide guide unit as set forth in claim 1, characterized in that said resin portion is built on said core block so as to cover around the front, rear, left and right sides of the slider.

3. The slide guide unit as set forth in claim 1, characterized in that said sliding contact member and/or the nut portion of said slider is constructed so as to be brought into contact elastically with said slide guide surface of the track rail or with said slide thread groove of said screw shaft.

4. The slide guide unit as set forth in claim 3, characterized in that said sliding contact member and/or said nut portion of said slider is provided with a slit along the length of said slider, whereby elasticity is given to said sliding contact member and/or the nut portion.

5. The slide guide unit as set forth in claim 1, characterized in that a support plate made of a resin is provided on one end of said track rail lying in the direction of width thereof for rotatably supporting said screw shaft, and said support plate is built on said track rail by molding.

* * * * *